Patented Nov. 24, 1953

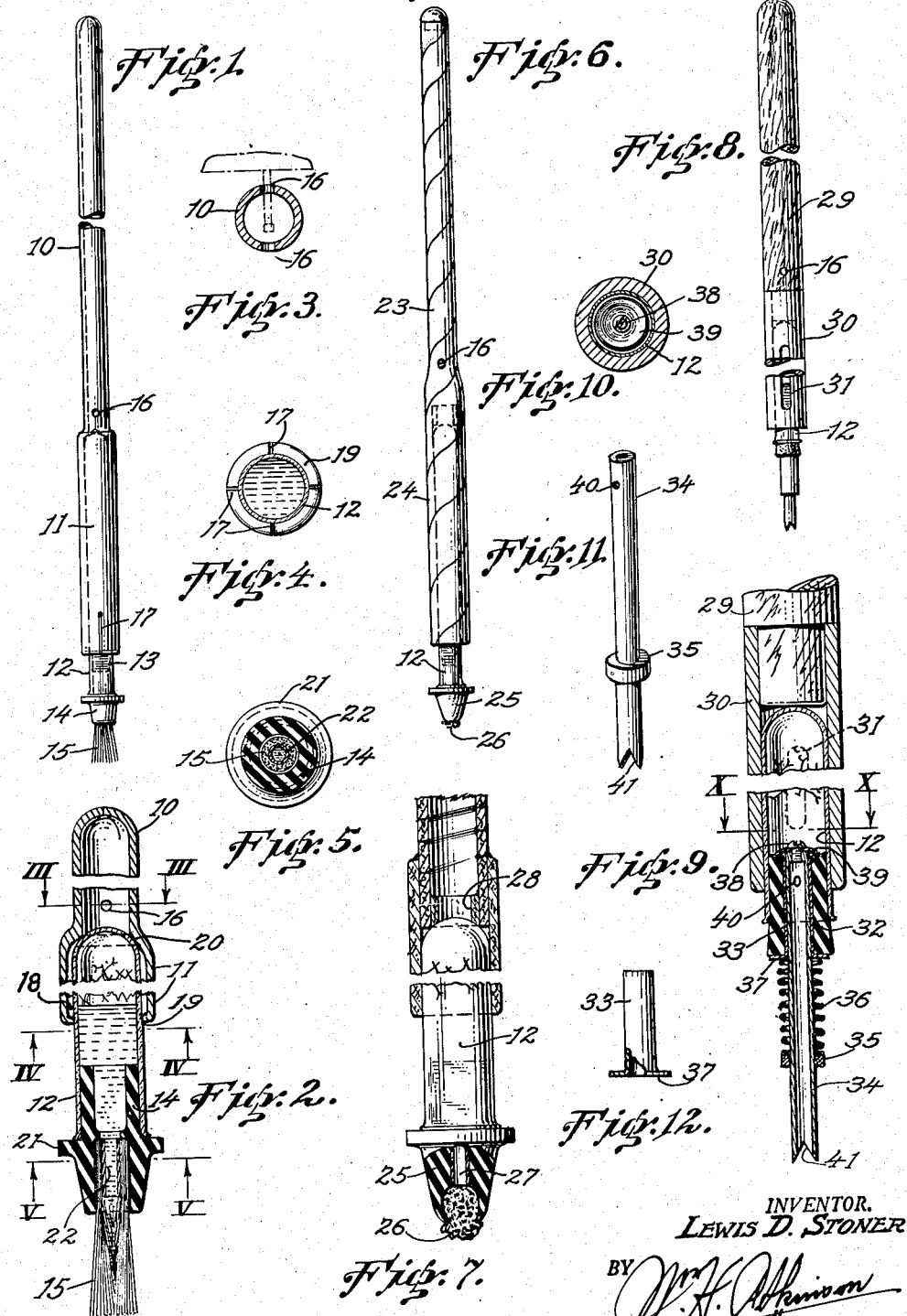

2,659,918

UNITED STATES PATENT OFFICE 2,659,918

WEED DESTROYING DEVICE

Lewis D. Stoner, Oakland, Calif., assignor to Alston Manufacturing Co., Oakland, Calif., a copartnership composed of Lewis D. Stoner and Ralph Albertson Application April 12, 1948, Serial No. 20,433

5 Claims. (Cl. 15—131)

My present invention relates to horticultural implements and more particularly to a new and novel device by which a toxic weed destroying chemical may be conveniently and effectively applied to weeds and like undesirable vegetation without contamination of the soil or harm to adjacent vegetation.

An object of the invention is to provide a new and novel device by which a toxic fluid may be conveniently and effectively applied to the crown of a weed in a new and novel manner.

Another object of the invention is to provide a toxic fluid applicator for use upon weeds and other undesirable vegetation in a new and novel manner.

Another object of the invention is to provide a toxic fluid dispensing device of new and novel construction by which controlled quantities of a weed killing fluid may be applied to individual weeds without destruction of surrounding vegetation.

The control of weeds and other undesirable vegetation has long presented a difficult problem to horticulturists and while there are now on the market many types of so-called selective toxic weed killing sprays these cannot always be effectively used. Such sprays to be practical must be made non-toxic to certain desirable and often adjacent vegetation, but in this the required selectivity is difficult to obtain. The most successful sprays can only be used upon weeds where grass is the other vegetation to be left unharmed. The use of a spray in this manner also presents the further objection that when applied to scattered weeds it requires the coverage of wide areas with the toxic fluid and as a result considerable of the fluid is expended to no useful purpose. These hand spraying operations also require considerable exertion on the part of the user. There are many situations in which even an extremely selective spray could not be used as, for example, in a flower garden where many different susceptible types of vegetation may be present. Under these conditions the gardener generally has no other alternative than to get down on his knees and pull the weeds by hand or dig them out with a suitable weed extracting tool. It is therefore a further object of my invention to provide a novel and effective means by which a toxic fluid can be applied to individual weeds without fear of contamination to either the surrounding soil or adjacent vegetation upon which the toxic may prove fatal.

Other objects and advantages of my invention will be in part evident to those skilled in the art and in part pointed out in connection with the accompanying drawing, wherein there is shown by way of illustration and not of limitation a preferred embodiment of the invention.

In the drawing:

Figure 1 is a side view showing a toxic fluid applicator constructed in accordance with the preferred embodiment of the invention, Figure 2 is a sectional view of the device shown in Figure 1, with parts broken out to foreshorten the view, Figures 3, 4 and 5 are horizontal sectional views taken along the respective section indicating lines as applied to Figure 2 of the drawing, Figure 6 is a view similar to that of Figure 1, showing a modified form of my improved toxic fluid applicator, Figure 7 is a view similar to Figure 2 showing the details of the device illustrated in Figure 6, Figure 8 is a view similar to Figures 1 and 6 showing a further modified form of the invention with parts broken out to foreshorten the view, Figure 9 is a view similar to Figures 2 and 7 showing details of the device of Figure 8, Figure 10 is a horizontal sectional view taken along lines X—X of Figure 9, and Figures 11 and 12 show in detail, parts employed in the device illustrated in Figures 8 and 9 of the drawing.

In the accompanying drawing I have shown three different forms of the present invention each of which embody a different physical structure, but it is to be understood that the principle involved in each particular instance resides in the provision of means whereby a toxic fluid may be conveniently applied to individual weeds in controlled amounts that will be effective to kill a contacted weed without contamination of the soil or destruction of surrounding susceptible vegetation.

Reference is first made to Figure 1 of the drawing wherein I have shown the preferred embodiment of my present invention. In this showing my improved applicator comprises an elongated tubular handle 10 which may be of any desired reachable length, but is preferably of a length corresponding to that of a walking cane. This handle 10 has an expanded socket forming portion 11 at its lower end that is of sufficient length to accommodate and firmly hold a conventional culture tube 12 in which a suitable toxic fluid is carried. Preferably the culture tube 12 will project outwardly from the socket forming portion 11 of the handle 10, a distance sufficient to provide a sighting area 13 which may be observed to determine when the toxic fluid contained in the culture tube 12 has become exhausted. Extending into and closing the open end of the culture tube 12 there is a suitably formed stopper 14 which, as will hereinafter appear, has a capillary passageway through which the toxic fluid contained in the culture tube 12 may flow by capillary action to a group of bristles or brush 15 mounted in the outer end thereof. The handle 10 has a hole 16 adjacent its expanded end, by which the device may be hung up when not in use. The socket forming portion 11 of the device is also here shown as having a plurality of spaced slots 17 that extend into its outer end and provide flexible portions which will firmly grip the culture tube 12 when placed therein.

By now referring to Figure 2 of the drawing it will be seen that the upper end of the tubular handle 10, which for lightness and balance is preferably made of aluminum, is crimped to close this end thereof. As indicated in Figure 3, the hole 16 may extend entirely through the handle 10 or into only one side thereof so that the device may be hung upon a nail projecting from a wall. The expanded socket forming portion 11 is also here shown as of a diameter that will leave an air space 18 between it and the contained culture tube 12. This expanded portion 11 is also preferably bent inwardly between the slots 17 at its end to provide culture tube gripping surfaces 19, as is more clearly indicated in Figure 4. With this arrangement it will be noted that when the culture tube 12 is projected fully into the expanded socket forming portion 11, its inner end will engage with an annular shoulder 20 which results from the expansion of the handle forming tube at this point. It this way the culture tube 12 is centered within the socket forming portion 11 so that a chamber of heat insulating air will be formed thereabout. As a result sudden changes in temperature will be rendered ineffective to expand any air within the culture tube 12 that might result in an ejection of the fluid therefrom due to this cause. The stopper 14 is preferably formed of an oil and acid resistant synthetic rubber or neoprene and it has a cylindrical portion that will fit snugly into the open end of the culture tube 12. Intermediate its ends the stopper 14 also has an outwardly extending annular flange 21 of a diameter sufficient to provide a buffer or bearing for the complete assembly which will serve to protect the culture tube 12 should the device be laid down or brought into contact with an adjacent object. This flange 21 will also serve to position the stopper 14 in proper cooperating relation with the culture tube 12. Secured within the extending end of the stopper 14 there is a group of bristles that form the brush 15. As is more clearly shown in Figure 5, these bristles are wrapped and secured by a suitable cincture around a central tubular member 22 so as to form the brush 15. This tubular member 22 has an inside diameter that will provide a substantially capillary conduit through which fluid carried by the culture tube 12 may flow when the brush 15 is brought into contact with a weed to be destroyed.

With the above described embodiment of the invention, the fluid carried by the culture tube 12 is simply painted upon any weed it is desired to kill. It is thus applicable to very small or soft textured weeds and even to the upright stem or blossom of any full grown weed, such as a thistle. In other words the device is universally applicable to all and any kinds of weeds and in all stages of their growth. It functions with mechanical perfection without any regulated output device as any desired quantity of the weed killing fluid can be "painted" upon the central crown or central stem of any weed. When in use, the fluid will flow off the brush 15 to any surface, as of a weed, to which the brush is touched or over which it may be drawn. When no such surface is in contact with the brush, no flow of the fluid will occur as atmosphere pressure plus the cohesion of the fluid to the bristles and the inner wall of the main tube will maintain a hydrostatic balance. When fluid flows out of the tube 12 by reason of contact of the brush 15 with any surface it will wet, air to replace this fluid will by-pass upward through the porosity of the brush and through the central tube 22 as provided in this construction.

Reference is now made to Figures 6 and 7 of the drawing for a detailed description of another embodiment of my invention wherein instead of using a metallic handle forming support I have shown my device as embodying an elongated tubular support or handle 23 which is formed of cardboard in a manner similar to that used in making up mailing tubes. In this particular instance the handle 23 is similarly provided with an enlarged end portion 24 into which the culture tube 12 may be inserted and held as in the case of the device above described. In this instance the culture tube 12 has a stopper 25 that is adapted to carry a sponge-like applicator 26 which may be of natural sponge or sponge rubber. As is more clearly shown in Figure 7 the stopper 25 is also provided with a central capillary tube 27 through which a toxic fluid contained within the culture tube 12 may flow to the sponge-like applicator 26. The culture tube 12 will be positioned to extend outwardly beyond the end of the tubular portion 24 to provide a sight opening as in the previous instance and at its inner end it will abut against a constricted portion 28 that will prevent its being pushed upwardly into the handle when in operation. It is believed that the operation of this particular device will be readily understood from the above. It would seem only necessary to here explain that as the sponge applicator is applied to a weed and compressed by contact therewith the toxic fluid carried thereby will be transferred to the weed and then as it is removed the air taken up thereby will find its way back into the culture tube 12 so as to insure a proper flow of the toxic fluid. In connection with this flow of the toxic fluid from the culture tube 12, it should be explained that the central capillary tube 27 will be of such a diameter as to also permit a counter-flow of air to properly vent the culture tube 12. In this connection it may be stated that the rate of flow will be determined by the ratio of the area to the length of the passages and should provide for both the exit of fluid and the admission of air into the tube container, the whole being in hydrostatic balance. The brush or sponge will thus always be saturated with fluid that will flow by gravity and surface attraction when the brush or sponge is contacted with a surface of a weed. Otherwise, atmospheric pressure will retain the fluid in the tube 12. For this device's successful use, a very careful proportioning of the diameters of the capillary tubes 22 and 27 to length is essential, but not critical. This can be easily determined by experiment with the particular fluid used.

Reference is now made to the remaining figures of the drawing wherein there is illustrated a further modified form which my invention may take. In this latter embodiment instead of a tubular handle my device has a solid wooden handle 29 which is provided with an outwardly extending tubular sleeve 30 into which the culture tube 12 may be positioned for support. In this case the culture tube 12 is substantially concealed within the tubular sleeve 30 and the latter portion is therefore provided with a sighting slot 31 through which the level of the fluid within the culture tube 12 may be observed when the device is in use. As is more clearly shown in Figure 9 of the drawing, the culture tube 12 carries a stopper 32 which will serve to close the open end thereof and centrally within the stopper 32 there is a flanged sleeve 33 into which an ejection tube 34 is slidably mounted. This ejection tube 34 carries a fixed collar 35 and is biased outwardly by means of a compression spring 36 that is positioned between the collar 35 and a flange 37 upon the sleeve 33. At its upper end the ejection tube 34 is closed and threaded for a screw 38 by which a cupped piston-like washer 39 is secured thereto. This washer 39 operates to retain the ejection tube 34 in its operative position within the stopper 32 and when the ejection tube 34 is pressed inwardly against the action of the compression spring 36 an aperture 40 formed therein will be exposed within the culture tube 12 and permit the flow of a quantity of the toxic fluid to the interior of the ejection tube 34. When the device is not in operation upon a weed and the ejection tube 34 is in the position here shown the piston-like washer 39 will serve to prevent the flow of any fluid from the culture tube 12. The ejection tube 34 is also provided with notches 41 at its end to facilitate a centering thereof upon the crown of a weed.

From the above it will be seen that with all of the devices herein described the toxic fluid will be applied directly to only those weeds which it is desired to eliminate in any particular area and therefore it will not be necessary to employ an expensive selective weed killing solution such as is provided for application by spray. As a suitable toxic fluid we have found that Dinitro Secondary Butyl Phenol in diesel oil using a 2% dilution gives excellent results.

While I have, for the sake of clearness and in order to disclose the invention so that the same can be readily understood, described and illustrated specific devices and arrangements, I desire to have it understood that this invention is not limited to the specific means disclosed, but may be embodied in other ways that will suggest themselves to persons skilled in the art. For example, I might dispense with the use of a separate container, such as the culture tube 12 for the toxic fluid, by forming the enlarged portions 11 and 24 of the handles 10 and 23 as the toxic fluid container. It is believed that this invention is new and all such changes as come within the scope of the appended claims are to be considered as part of this invention.

Having thus described my invention, what I claim and desire to secure by Letters Patent is:

1. As an article of manufacture for the destruction of weeds, the combination of an elongated tubular handle of a length sufficient to engage the ground when held in the hand of an operator standing erect and having its ground engaging end expanded to form an axially extending tubular socket, a removable cylindrical fluid container having an open end adapted to be positioned with its closed end engaging the inner end of said socket to thereby center the container therein, a fluid absorbent applicator mounted in the open end of said cylindrical fluid container adapted and arranged to absorb fluid from the interior of said container for application to a weed, said socket also having a plurality of spaced axially extending slots forming flexible fingers that flex inwardly to engage with and center said container within the socket at its outer end, whereby a heat insulating air space will be provided within said socket and about the container that will prevent a sudden expansion of air within said cylindrical container when said socket is exposed to a raising ambient temperature.

2. In a weed destroying device, the combination of a supporting handle of a length sufficient to engage the ground when held in the hand of an operator standing erect and having a socket at its lower end, a culture tube inserted in said socket and held in an inverted position with its open end exposed, a stopper as a closure at the outer end of said culture tube, a weed engageable brush of fluid entraining construction mounted in an extending position at the outer end of said stopper, and a capillary passageway extending through said stopper for conducting fluid from the interior of said culture tube to said fluid entraining brush, whereby the fluid conducted to said fluid entraining brush may be deposited upon a weed by an operator standing erect when said brush is pressed into contact with a weed.

3. In a weed destroying device, the combination of a tubular glass container for a toxic weed killing fluid, a non-metallic stopper at the open end of said container having a pliable annular shoulder extending therearound intermediate its ends and forming a projecting guard to protect said glass container against breakage due to sidewise contact with an adjacent object, a brush of bound bristles attached to and carried by said stopper and extending outwardly in co-axial relation with said tubular container, means forming a capillary conduit through said stopper from the interior of said glass container to a point adjacent the point of attachment of said bristles to the stopper, and a handle of walking cane length having a co-axially extending socket at its lower end into which said glass container may be positioned as an extension of said handle, whereby fluid carried by said glass container may be conveniently applied to growing weeds with a daubing action while said handle is held in the hand of an operator standing erect.

4. In a weed destroying device, the combination of an open ended transparent cylindrical container into which a toxic weed killing fluid may be carried, a stopper in the open end of said container having a fluid pasageway and a brush of bound bristles extending from its outer end through which a toxic fluid may flow from said container to a weed by capillary action when said brush is pressed into contact therewith, and a supporting handle for said container having a socket at one end for holding of said container, said socket being of a depth sufficient to leave a small portion of said container exposed at its outer end to provide a sight of its contents and said handle being of a length sufficient to permit contact of said brush with the ground when held in the hand of an operator standing erect.

5. In a weed destroying device, the combination of an open ended fluid container, a closure means at the open end of said fluid container, a fluid conducting brush carried by and extending outwardly from said closure means, means forming a fluid conducting passageway adapted and arranged to conduct fluid by capillary flow from the interior of said container to said brush when said brush is pressed into engagement with a weed, and an elongated tubular handle of walking cane length having its ground engaging end slotted longitudinally to form spaced flexible fingers for supporting said open ended fluid container in an inverted position with said fluid conducting brush extending co-axially therewith, whereby said container may be conveniently removed for filling and the toxic weed destroying fluid applied to a weed by an operator while standing erect.

LEWIS D. STONER.

References Cited in the file of this patent

UNITED STATES PATENTS

| Number | Name | Date |
|---|---|---|
| 948,110 | Lombard | Feb. 1, 1910 |
| 1,738,471 | D'Amore | Dec. 3, 1929 |
| 1,826,587 | Wright | Oct. 6, 1931 |
| 1,839,548 | Gimonet | Jan. 5, 1932 |
| 1,910,669 | Beiderman | May 23, 1933 |
| 2,221,630 | Bjorkman | Nov. 12, 1940 |
| 2,243,607 | Rosen | May 27, 1941 |

FOREIGN PATENTS

| Number | Country | Date |
|---|---|---|
| 353,369 | Germany | May 13, 1922 |